(12) United States Patent
Rodecker

(10) Patent No.: US 8,794,585 B2
(45) Date of Patent: Aug. 5, 2014

(54) COMPACT COULOMB DAMPER

(75) Inventor: Troy P. Rodecker, Berlin Heights, OH (US)

(73) Assignee: The Pullman Company, Milan, OH (US)

( * ) Notice: Subject to any disclaimer, the term of this patent is extended or adjusted under 35 U.S.C. 154(b) by 221 days.

(21) Appl. No.: 13/050,032

(22) Filed: Mar. 17, 2011

(65) Prior Publication Data
US 2012/0056070 A1 Mar. 8, 2012

Related U.S. Application Data

(60) Provisional application No. 61/379,491, filed on Sep. 2, 2010.

(51) Int. Cl.
*F16M 13/00* (2006.01)
*F16L 3/00* (2006.01)
*B60K 13/04* (2006.01)

(52) U.S. Cl.
USPC ............. 248/636; 248/49; 248/58; 248/638; 248/346.2; 180/89.2; 180/296; 180/309; 180/381

(58) Field of Classification Search
USPC .......... 248/636, 49, 58, 638, 346.2; 180/89.2, 180/296, 309, 381
See application file for complete search history.

(56) References Cited

U.S. PATENT DOCUMENTS

| | | | |
|---|---|---|---|
| 2,417,347 A | 3/1947 | Brown | |
| 2,715,951 A | 8/1955 | Lieber | |
| 3,141,523 A | 7/1964 | Dickie | |
| 3,237,716 A * | 3/1966 | Parsons | 181/243 |
| 3,946,764 A * | 3/1976 | Hubbell, III | 138/148 |
| 3,960,232 A * | 6/1976 | Hubbell, III | 180/309 |
| 3,963,087 A * | 6/1976 | Grosseau | 180/309 |
| 3,977,486 A * | 8/1976 | Kleinschmit | 248/573 |
| 4,174,616 A * | 11/1979 | Nederlof et al. | 60/517 |
| 4,410,013 A * | 10/1983 | Sasaki et al. | 138/149 |
| 4,807,840 A | 2/1989 | Baker et al. | |
| 4,824,705 A * | 4/1989 | Persson et al. | 428/35.9 |
| 5,502,342 A * | 3/1996 | Feldkamp et al. | 310/51 |
| 5,844,177 A * | 12/1998 | Pirchl | 181/211 |
| 5,996,730 A * | 12/1999 | Pirchl | 181/211 |
| 6,530,443 B1 * | 3/2003 | Tsuruta et al. | 180/89.2 |
| 6,536,548 B2 * | 3/2003 | Steenackers et al. | 180/89.2 |

(Continued)

FOREIGN PATENT DOCUMENTS

| | | |
|---|---|---|
| JP | 10-002220 | 1/1998 |
| JP | 2000-006673 | 1/2000 |
| JP | 2006-097560 | 4/2006 |

OTHER PUBLICATIONS

Search Report and Written Opinion dated Feb. 23, 2012 from corresponding PCT Application No. PCT/US2011/043497.

*Primary Examiner* — Terrell McKinnon
*Assistant Examiner* — Christopher Garft
(74) *Attorney, Agent, or Firm* — Harness, Dickey & Pierce, P.L.C.

(57) ABSTRACT

A coulomb damper is attached to a component of an exhaust system. The inner surface of the coulomb damper is in intimate contact with the outer surface of the component of the exhaust system. The intimate contact is defined by a pair of weld lines extending along an axial length of the coulomb damper in one embodiment. In another embodiment, the intimate contact is defined by at least a three point contact between the coulomb damper and the component of the exhaust system.

9 Claims, 4 Drawing Sheets

(56) References Cited

U.S. PATENT DOCUMENTS

| | | |
|---|---|---|
| 6,755,403 B2 * | 6/2004 | Lewis et al. .................. 267/141 |
| 6,981,579 B2 | 1/2006 | Kuwayama et al. |
| 2006/0042871 A1 | 3/2006 | Yasuda et al. |
| 2008/0203263 A1 * | 8/2008 | Carnevali .................. 248/346.2 |
| 2009/0072116 A1 * | 3/2009 | Fielding ...................... 248/638 |
| 2009/0230601 A1 * | 9/2009 | Lenda ........................ 267/141.1 |
| 2011/0147558 A1 * | 6/2011 | Marquardt et al. ........ 248/346.2 |
| 2011/0240827 A1 * | 10/2011 | Malloy et al. ................. 248/636 |

\* cited by examiner

COMPACT COULOMB DAMPER

CROSS-REFERENCE TO RELATED APPLICATIONS

This application claims the benefit of U.S. Provisional Application No. 61/379,491, filed on Sep. 2, 2010. The entire disclosure of the above application is incorporated herein by reference.

FIELD

The present disclosure relates to a coulomb damper for an automotive/truck exhaust system. More particularly, the present disclosure relates to a compact coulomb damper which is intimately attached directly to an exhaust pipe of the automotive/truck exhaust system.

BACKGROUND

This section provides background information related to the present disclosure which is not necessarily prior art.

Typically, automotive vehicles including cars and trucks have an internal combustion engine (gasoline or diesel) which is coupled to at least a transmission and a differential for providing power to the driven wheels of the vehicle. An engine exhaust system which typically includes one or more exhaust pipes, one or more turbochargers, one or more catalytic converters, one or more mufflers and one or more tailpipes is attached to the engine to quiet the combustion process, to clean the exhaust gases and to route the products of combustion away from the engine. The internal combustion engine is supported in the vehicle on a set of flexible engine mounts which are positioned between a frame or other supporting structure and the engine. The exhaust system is supported by exhaust mounts which are positioned between the exhaust system and the frame or other supporting structure of the vehicle's body. In order to minimize engine vibrations from being transmitted to the vehicle's body, the exhaust mounts incorporate flexible mounting members and/or elastic suspension members.

Even with using the flexible engine mounts and the flexible exhaust mounts, the operation of the engine at the various operating conditions for the engine can cause offensive noise, vibration or harshness (NVH) issues. Various solutions to these NVH issues have been proposed. A frequency NVH issue can be addressed by adding dead mass weights to the system, adding a tuned damper and/or adding a coulomb damper.

The addition of dead mass weights to the system will simply shift the natural frequency of the system to a lower frequency. Adding a tuned damper will only address a specific frequency. The tuned damper accomplishes this by shifting the natural frequency amplitude into a lesser amplitude at a frequency above and below the original. A coulomb damper is comprised of a canister filled with impact media such as shot or sand. A coulomb damper is a broadband solution which is sensitive to the quantity, density, geometry and friction of the impact media inside the canister. In addition, the efficiency of the energy transmission from the exhaust system into the impact media of the coulomb damper is critical to the operation and effectiveness of the coulomb damper.

SUMMARY

This section provides a general summary of the disclosure, and is not a comprehensive disclosure of its full scope or all of its features.

The present disclosure provides the art with a coulomb damper which includes a large quantity of impact media and which is intimately mounted to the exhaust system to provide excellent energy transmission into the impact media. The rigid canister which holds the impact media transmits the energy from the exhaust system into any impact media that contacts the walls of the canister. The energy transmission between the exhaust system and the coulomb damper is improved by using at least a three point mounting system where the coulomb damper is bolted directly to an exhaust pipe or the energy transmission is improved when the coulomb damper is welded directly to the exhaust pipe. This system is an improvement over a system which uses a bracket to mount a damper because the bracket impedes energy transmission.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
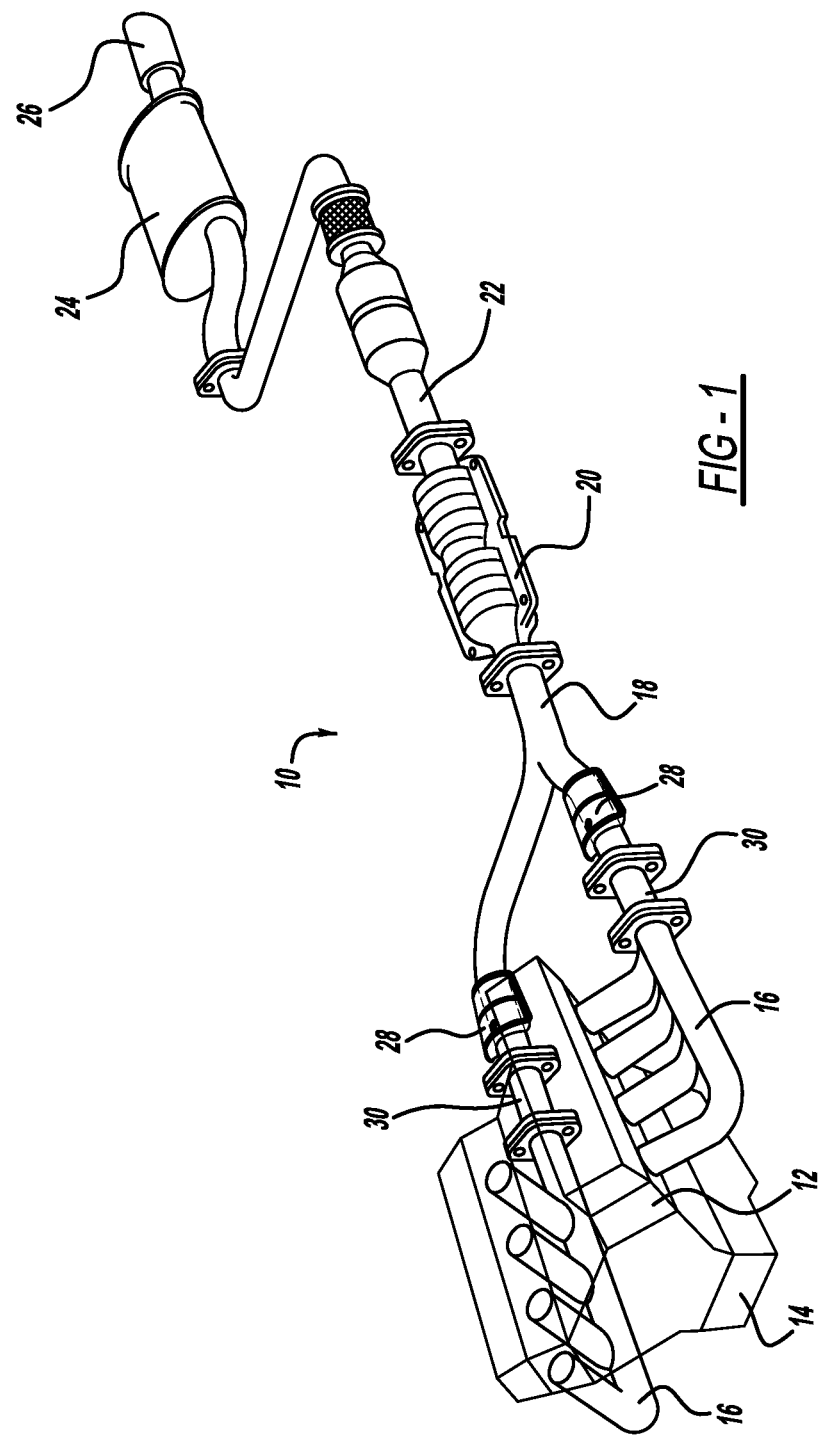
FIG. 1 is a perspective view of an exhaust system which includes a coulomb damper in accordance with the present disclosure.

Referring now to the drawings, in which like reference numerals designate like or corresponding parts throughout the several views, there is illustrated in FIG. 1 an exhaust system in accordance with the present disclosure and which is designated by the reference numeral 10. Exhaust system 10 is attached to exhaust headers 12 of an internal combustion engine 14. Internal combustion engine 14 is designed to power one or more drive wheels of the vehicle through a transmission (not shown) and one or more differentials (not shown) as is well known in the art.

Exhaust system 10 comprises a pair of front exhaust pipes 16, a mid-pipe 18, a catalytic converter 20, a rear exhaust pipe 22, a muffler 24, a tailpipe 26, a pair of coulomb dampers 28 and one or more turbochargers 30 (shown schematically). Exhaust system 10 routes the products of combustion from internal combustion engine 14 which are collected by exhaust headers 12 to the outer periphery of the vehicle. As illustrated in FIG. 1, exhaust system 10 routes the products of combustion for internal combustion engine 14 to the rear of the vehicle. While illustrated as routing products of combustion to the rear of the vehicle, exhaust system 10 can be configured to route the products of combustion to any peripheral location of the vehicle including but not limited to the side or sides of the vehicle.

As illustrated, a pair of front exhaust pipes 16 are attached to a pair of turbochargers 30 which are attached to a single mid-pipe 18 which is attached to a singe catalytic converter 20 which is attached to a single rear exhaust pipe 22 which is attached to a single muffler 24 which is attached to a single tailpipe 26. It is within the scope of the present disclosure to have a single front exhaust pipe 16 attached to a single turbocharger attached catalytic converter 20 to provide a single path exhaust system. It is also within the scope of the present disclosure to have the pair of front exhaust pipes 16 attached to the pair of turbochargers 30 attached to a pair of mid-pipes 18 which can be attached to a pair of catalytic converters 20 which can be attached to a pair of rear exhaust pipes 22 which can be attached to a pair of mufflers 24 which can be attached to a pair of tailpipes 26 to provide a dual path exhaust system. Thus, exhaust system 10 can be configured to be a single path exhaust system, a dual path exhaust system or any other configuration of exhaust system known in the art.

During the operation of the vehicle and internal combustion engine 14, vibrations generated by the internal combustion engine 14, the turbochargers 30 and the vehicle can create offensive noise, vibration or harshness (NVH) issues. Coulomb dampers 28 are intimately attached to components of exhaust system 10 to address these offensive NVH issues. While coulomb dampers 28 are illustrated as being intimately attached to mid-pipe 18, it is within the scope of the present disclosure to attach coulomb dampers 28 to any component of exhaust system 10 including but not limited to front exhaust pipes 16, mid-pipe 18, catalytic converter 20, rear exhaust pipe 22, muffler 24 and/or tailpipe 26.

Figure 2:
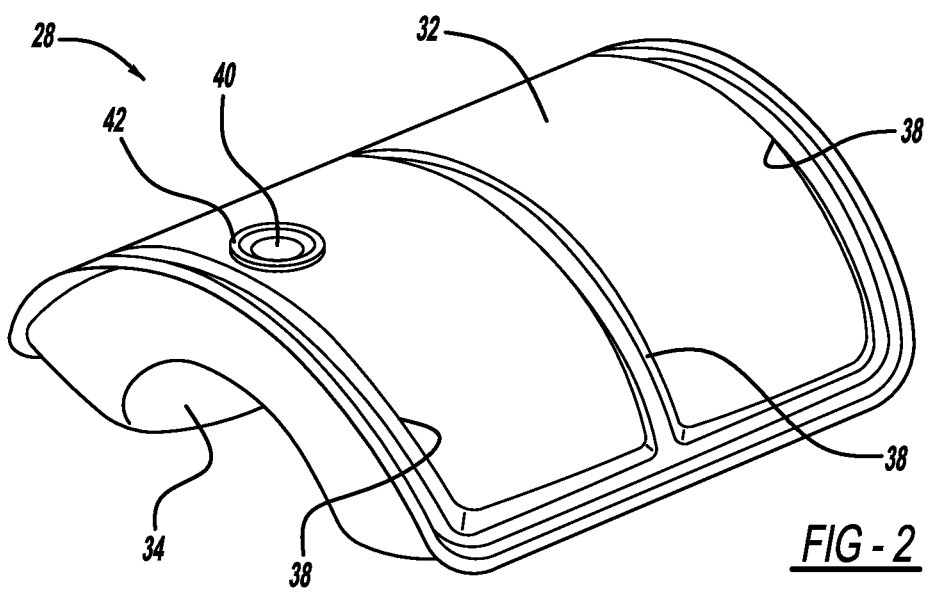
FIG. 2 is a perspective view of one of the coulomb dampers illustrated in FIG. 1.
Figure 3:
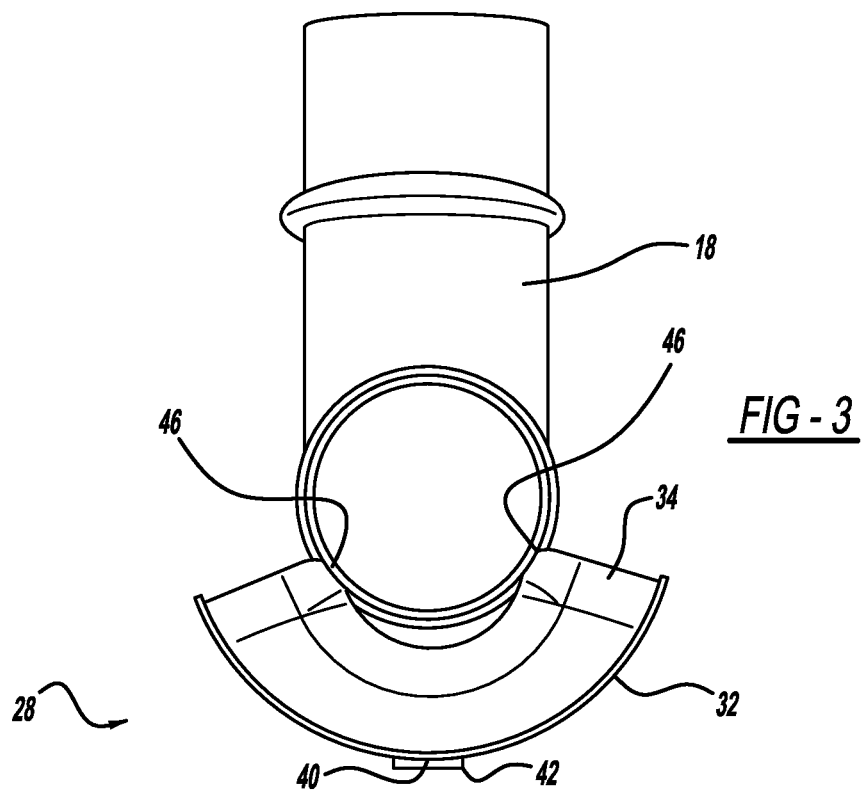
FIG. 3 is an end view of the coulomb damper illustrated in FIG. 2 attached to an exhaust pipe of the exhaust system illustrated in FIG. 1.
Figure 4:
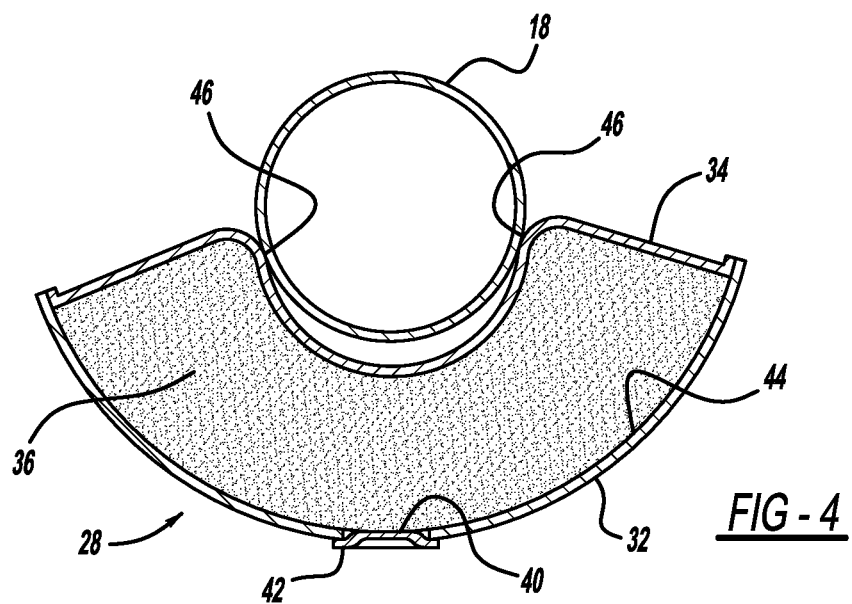
FIG. 4 is an end cross-sectional view of the coulomb damper illustrated in FIG. 1.

Referring now to FIGS. 2-4, coulomb damper 28 is illustrated in greater detail. Coulomb damper 28 comprises a canister formed by an outer member 32, an inner member 34, and a specified volume or mass of impact media 36. Outer member 32 is an arcuate or curved shaped metal stamping that defines a plurality of stiffening ribs 38 that act as alignment features for inner member 34 as well as providing the necessary stiffness or strength to coulomb damper 28. A fill port 40 extends through outer member 32 at a specified position which simplifies the addition of impact media 36 into coulomb damper 28. A button cap 42 closes fill port 40 after the addition of impact media 36. Button cap 42 is welded or otherwise attached to outer member 32 to maintain impact media 36 within a chamber 44 defined by coulomb damper 28. The longitudinal length, the curved length and the space between outer member 32 and inner member 34 are selected to provide a specific volume of impact media 36 while at the same time providing specific clearances with other components of the vehicle when exhaust system 10 is installed in the vehicle. In addition, when designing coulomb damper 28, both the clearances in the assembled position of exhaust system 10 and the clearances necessary to provide routine maintenance and/or replacement of components of the vehicle are taken into consideration.

Inner member 34 is an arcuate or curved cup shaped metal stamping that conforms to mid-pipe 18 and is welded or otherwise attached to outer member 32 to define chamber 44. Inner member 34 defines a pair of small radii 46, 5 mm in the preferred embodiment, that extend along the longitudinal length of inner member 34 and thus coulomb damper 28. As illustrated in FIGS. 3 and 4, the diameter of the arcuate or curved portion of inner member 34 is designed to be slightly smaller than the outside curve of mid-pipe 18. As also illustrated in FIGS. 3 and 4, the inner member 34 of the canister has a curved concave outer surface which is in close proximity with an outer surface of mid-pipe 18. The outer surface of inner member 34 has a first and second convex portion, illustrated at 46 in FIG. 4, which extend over an entire length of the canister in the axial direction and are in direct contact with the mid-pipe 18. Said in other terms, as illustrated in FIG. 4, a distance measured between convex portions 46 is less than a diameter of the mid-pip 18 since a line connecting convex portions 46 does not pass through the center of the mid-pipe, thus being less than the diameter of the mid-pipe 18. This feature ensures that the outer surface of inner member 34 defined by radii 46 contact mid-pipe 18 entirely along a pair of contact areas extending an entire length of inner member 34 to provide the intimate contact between mid-pipe 18 and coulomb damper 28. This feature will also minimize the required weld fillet simplifying the welding of coulomb damper 28 to mid-pipe 18.

Impact media 36 can be steel shot, sand or any other impact media known in the art. The design of coulomb damper 28 provides a large quantity of impact media 36 (25 cubic inches in the preferred embodiment) that is intimately attached (welded) to mid-pipe 18 to provide excellent energy transmissibility from mid-pipe 18 into impact media 36. The rigid design of outer and inner members 32 and 34 also transmit the energy into any impact media 36 that is in direct contact with the inner surfaces of outer and inner members 32 and 34. Coulomb damper 28 provides a large canister volume constrained in intimate contact with mid-pipe 18 which provides a compact design for any application. Coulomb damper 28 is welded to mid-pipe 18 for excellent energy transmissibility. Outer and inner members 32 and 34 are designed to provide the optimized density, geometry, quantity, air space for movement and friction for impact media 36.

Figure 5:
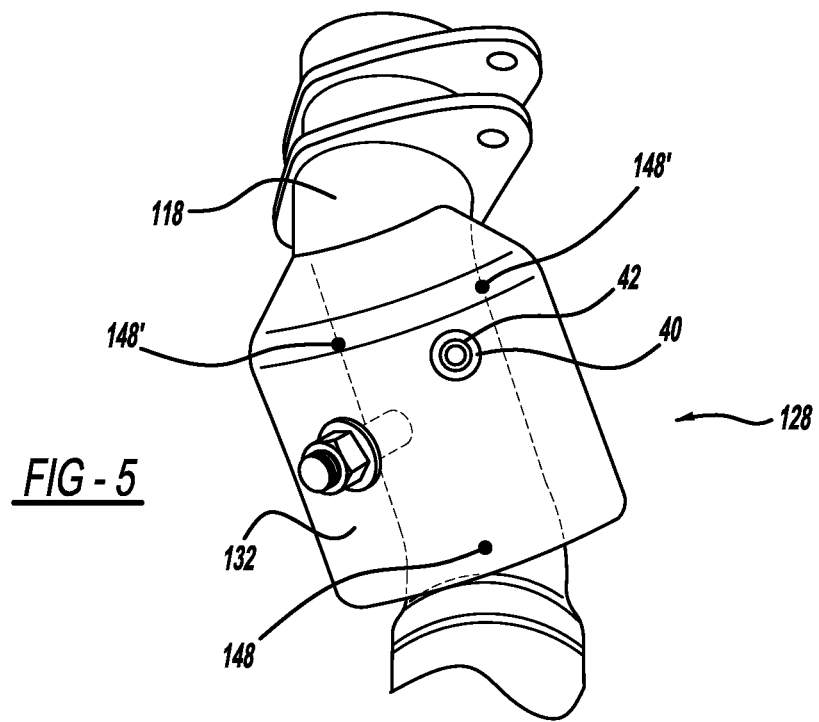
FIG. 5 is a perspective view of a coulomb damper in accordance with another embodiment of the present disclosure.
Figure 6:
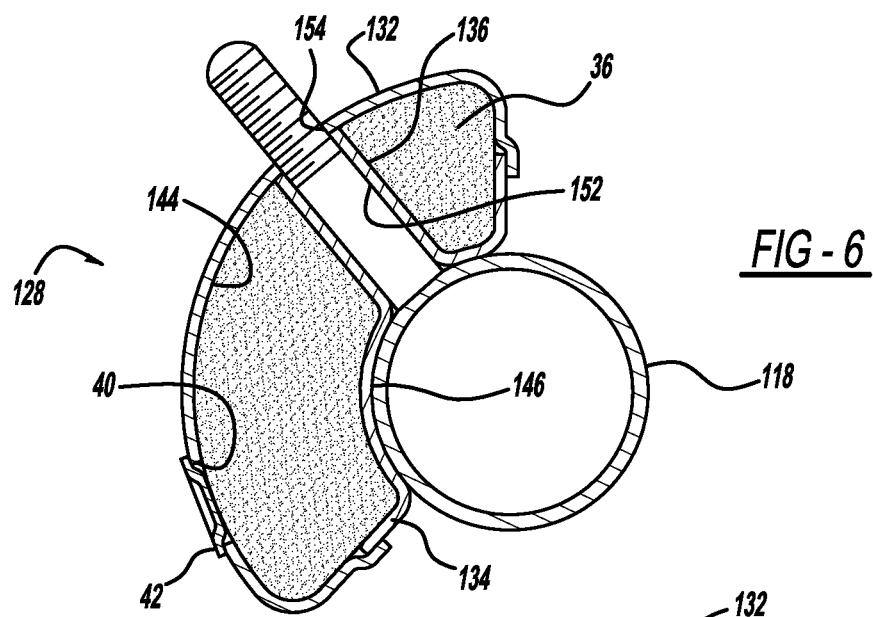
FIG. 6 is an end cross-sectional view of the coulomb damper illustrated in FIG. 5; and, FIG. 7 is an end perspective view partially in cross-section of a coulomb damper in accordance with another embodiment of the present disclosure.
Figure 7:
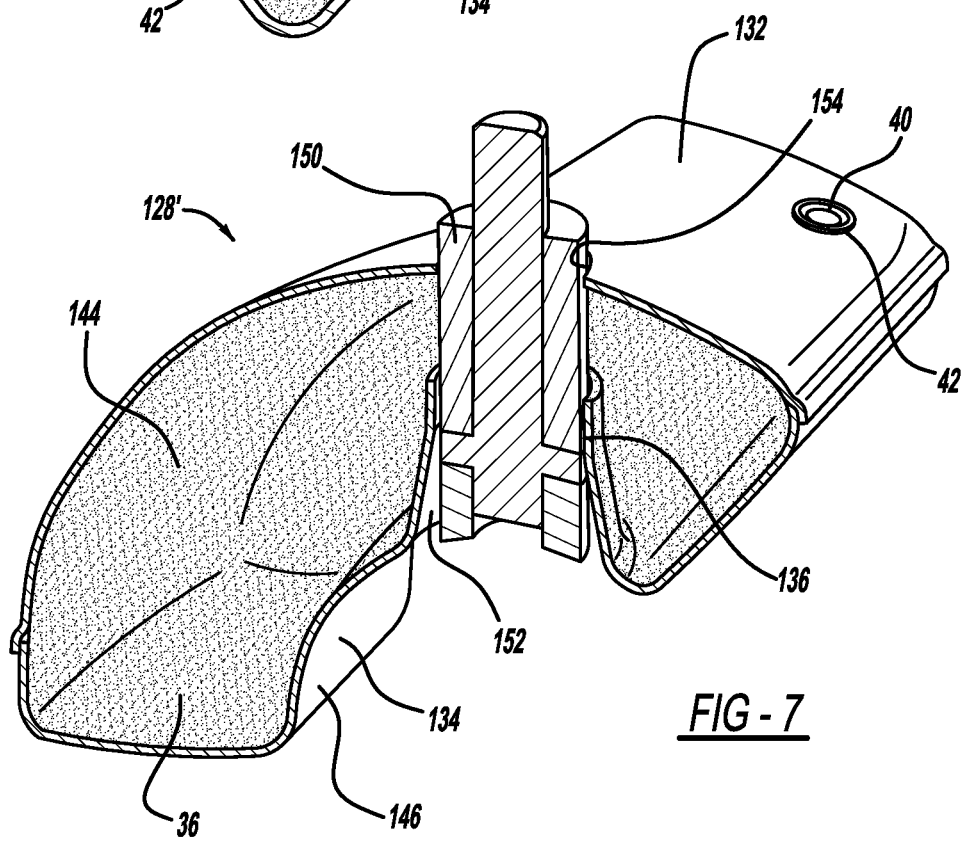

Referring now to FIGS. 5-7, coulomb dampers 128 and 128' are illustrated attached to a mid-pipe 118. Mid-pipe 118 can replace mid-pipe 18 and coulomb dampers 128 and 128' can replace coulomb damper 28 in exhaust system 10. In addition, coulomb dampers 128 and 128' can be attached to any component of exhaust system 10 similar to coulomb damper 28 as discussed above. Coulomb dampers 128 and 128' comprise a canister formed by an outer member 132, an inner member 134, an inner tube 136 and impact media 36.

Outer member 132 is an arcuate or curved shaped metal stamping. While not illustrated in FIGS. 5-7, outer member 132 can include stiffening ribs 38 for alignment and stiffness increase as discussed above for outer member 32. Fill port 40 extends through outer member 132 at a specified position that simplifies the addition of impact media 36 into coulomb dampers 128 and 128'. Button cap 42 closes fill port 40 after the addition of impact media 36. Button cap 42 is welded or otherwise attached to outer member 132 to maintain impact media 36 within a chamber 144 defined by coulomb dampers 128 and 128'. The longitudinal length, the curved length and the space between outer member 132 and inner member 134 are selected to provide a specific volume of impact media 36 while at the same time providing specific clearances with other components of the vehicle when exhaust system 10 is installed in the vehicle. In addition, when designing coulomb dampers 128 and 128', both the clearances in the installed position of exhaust system 10 and the clearances necessary to provide routine maintenance and/or replacement of components of the vehicle are taken into consideration.

Inner member 134 is an arcuate or curved cup shaped metal stamping that is welded or otherwise attached to outer member 132 to define chamber 144. Inner member 134 defines an inner curved surface 146 that extends along the longitudinal length of inner member 134 and thus coulomb dampers 128 and 128'. As illustrated in FIG. 6, the size of the inner curved surface 146 is designed to be the same as the outside diameter of mid-pipe 118. This feature provides a three point contact between coulomb dampers 128 and 128' and mid-pipe 118 as illustrated by lower points 148 and upper points 148' in FIG. 5. Coulomb dampers 128 and 128' are designed with an interference fit to a top of a pipe bend in mid-pipe 118 to create an initial primary touch point as illustrated by lower point 148 illustrated in FIG. 5. Lift off creates the second and third touch points as illustrated by the upper points 148' in FIG. 5 to create a stable tripod footing spaced from the mounting bolt. This three point contact provides the stable tripod footing spaced away from the mounting bolt creating a tensile load only on the mounting bolt. There is no cantilever loading on the mounting bolt. This three point contact and subsequent tightening of the retaining nut on the mounting bolt provides the intimate contact between mid-pipe 118 and coulomb dampers 128 and 128'. The embodiment in FIG. 7 also includes the three point contact described above.

Inner tube 136 extends between outer and inner members 132 and 134 as illustrated in FIGS. 6 and 7. In FIG. 6, inner tube 136 is designed to accept the mounting bolt that is welded or otherwise secured to mid-pipe 118. In FIG. 7, inner tube 136 is designed to accept a tubular bushing 150 which is designed to accept the mounting bolt that is welded, threaded or otherwise attached to mid-pipe 118. Inner member 134 defines a drawn hole 152 formed by inner tube 136. Outer member 132 defines an aperture 154. In the embodiment of FIG. 6, inner tube 136 extends out to outer member 132 where it is welded or otherwise secured to the portion of outer member 132 that defines aperture 154. In the embodiment of FIG. 7, tubular bushing 150 extends through inner tube 136, drawn hole 152 and aperture 154. Bushing 150 is welded or otherwise secured to inner tube 136 and welded or otherwise secured to the portion of outer member 132 that defines aperture 154. In FIG. 6, inner tube 136 and bushing 150 are designed to not withstand the proof load of the mounting bolt. Thus, excessive torque applied to the retaining nut on the mounting bolt will cause inner tube 136 and bushing 150 to collapse and will not cause the mounting bolt to fail. In the embodiment of FIG. 7, inner tube 136, bushing 150 and outer member 132 are designed to exceed the proof load of the mounting bolt. Thus, excessive torque applied to the retaining nut on the mounting bolt will cause the mounting bolt to break. The mounting bolt in FIG. 7 is easily replaced. In the embodiment of FIG. 7, inner tube 136 enlarges toward the outer portion of inner tube 136 in order to clear the welding boss for the mounting bolt.

Impact media 36 can be steel shot, sand or any other impact media known in the art. The design of coulomb dampers 128 and 128' provides a large quantity of impact media 36 (25 cubic inches in the preferred embodiment) that is intimately attached or bolted with three point contact to mid-pipe 118 to provide excellent energy transmissibility from mid-pipe 118 into impact media 36. The rigid design of outer and inner members 132 and 134 also transmit the energy into any impact media 36 that is in direct contact with the inner surfaces of outer and inner members 132 and 134. Coulomb dampers 128 and 128' provides a large canister volume constrained in intimate contact with mid-pipe 118 which provides a compact design for any application. Coulomb dampers 128 and 128' is bolted to mid-pipe 118 for excellent energy transmissibility. Outer and inner members 132 and 134 are designed to provide the optimized density, geometry, quantity, air space for movement and friction for impact media 36.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A coulomb damper in combination with an exhaust system, the combination comprising:
    a canister having an inner member with a curved inner surface and an outer member with a curved inner surface, said inner member and said outer member defining a closed chamber;
    an impact media disposed within said chamber, said impact media being selected from one of metal shot and sand, said impact media extending entirely between said curved inner surfaces and being in direct contact with both of said curved inner surfaces over an entire circumferential length of said curved surfaces in said chamber, said impact media extending over a portion of said canister in an axial direction;
    a component of said exhaust system separate from said canister, a curved concave outer surface of said inner member of said canister being in close proximity with an outer surface of said component of said exhaust system; wherein
    said outer surface of said inner member of said canister defining a first convex portion at a first side of said inner member, the first convex portion extending over an entire length of said canister in the axial direction;
    said outer surface of said inner member of said canister defining a second convex portion at a second side of said inner member opposite to said first side, the second convex portion extending over the entire length of said canister in the axial direction; and
    the first and second convex portions are in direct contact with said outer surface of said component of said exhaust system.

2. The coulomb damper in combination with an exhaust system according to claim 1, wherein said intimate contact comprises a pair of contact areas extending along the axial length of said canister.

3. The coulomb damper in combination with an exhaust system according to claim 2, further comprising a weld extending along each of said pair of contact areas.

4. The coulomb damper in combination with an exhaust system according to claim 2, wherein a distance between said first and second convex portions is less than a diameter of the component of said exhaust system.

5. The coulomb damper in combination with an exhaust system according to claim 1, wherein a distance between said first and second convex portions is less than a diameter of the component of said exhaust system.

6. The coulomb damper in combination with an exhaust system according to claim 1, wherein said canister is curved to conform to a shape of said component of said exhaust system.

7. The coulomb damper in combination with an exhaust system according to claim 1, wherein said canister is welded to said component of said exhaust system.

8. The coulomb damper in combination with an exhaust system according to claim 1, wherein said inner member of said canister extends circumferentially around a portion of said component of said exhaust system, said portion being less than an entire circumference of said component of said exhaust system.

9. The coulomb damper in combination with an exhaust system according to claim 1, wherein said canister extends circumferentially around a portion of said component of said exhaust system, said portion being less than an entire circumference of said component of said exhaust system.

* * * * *